United States Patent [19]

van der Lely

[11] 4,280,565

[45] Jul. 28, 1981

[54] SOIL WORKING MACHINE

[76] Inventor: Cornelis van der Lely, 7 Brüschenrain, Zug, Switzerland

[21] Appl. No.: 55,013

[22] Filed: Jul. 5, 1979

[30] Foreign Application Priority Data

Jul. 5, 1978 [NL] Netherlands ..................... 7807270
Jul. 5, 1978 [NL] Netherlands ..................... 7807271

[51] Int. Cl.³ .................. A01B 7/00; A01B 9/00; A01B 33/02; A01B 33/10
[52] U.S. Cl. .................. 172/548; 172/123; 172/125; 172/117; 172/555
[58] Field of Search ............. 172/117, 548, 60, 120, 172/112, 123, 555, 55, 63, 68, 47, 124, 103, 119, 125

[56] References Cited

U.S. PATENT DOCUMENTS

| 1,254,817 | 1/1918 | Leslie | 172/117 X |
| 1,408,615 | 3/1922 | Lofton | 172/117 X |
| 1,662,088 | 3/1928 | Von Raussendorff | 172/112 X |
| 2,233,491 | 3/1941 | Simpson | 172/117 X |
| 2,658,437 | 11/1953 | Peters | 172/117 X |
| 3,125,166 | 3/1964 | Hines, Sr. | 172/120 |
| 3,130,796 | 4/1964 | Rogers | 172/117 |
| 3,137,350 | 6/1964 | Horr | 172/117 |
| 3,183,980 | 5/1965 | Howard et al. | 172/112 X |
| 3,779,320 | 12/1973 | Cantone | 172/60 |
| 3,885,633 | 5/1975 | Lely et al. | 172/117 X |
| 4,026,364 | 5/1977 | Lely | 172/123 |

FOREIGN PATENT DOCUMENTS

| 2318214 | 10/1973 | Fed. Rep. of Germany | 172/120 |
| 197989 | 5/1923 | United Kingdom | 172/117 |
| 789106 | 1/1958 | United Kingdom | 172/47 |

Primary Examiner—Paul E. Shapiro
Attorney, Agent, or Firm—William B. Mason

[57] ABSTRACT

A soil cultivating machine includes a frame and a plurality of cultivating members in one or more groups journalled to said frame. Each group is driven to rotate about a horizontal shaft extending substantially transverse to the direction of machine travel. The groups of cultivating members are preferably arranged in at least two groups located side-by-side and pivotable about transverse pivots to move vertically against spring opposition to avoid obstacles. Each cultivating member is made of semicircular plates fastened to rings on the horizontal shaft and the plates can have cuts that divide them into segment parts. The outer working portions of the plates can be offset so that neighboring members work paths that overlap or are closely adjacent one another. Each group has respective side plates and a hood supported by the plates and the hood is interconnected to the frame with a spring-loaded rod.

10 Claims, 13 Drawing Figures

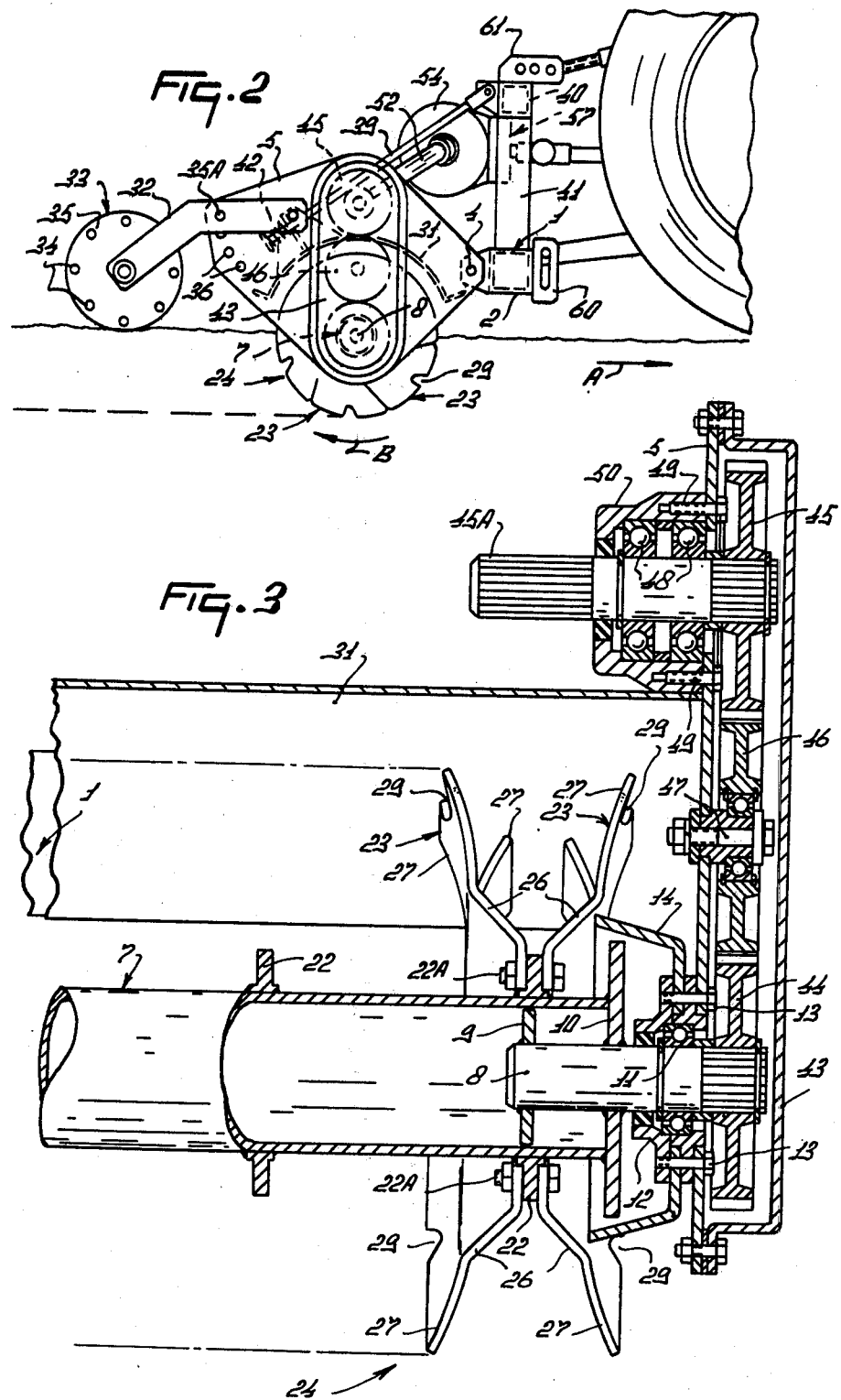

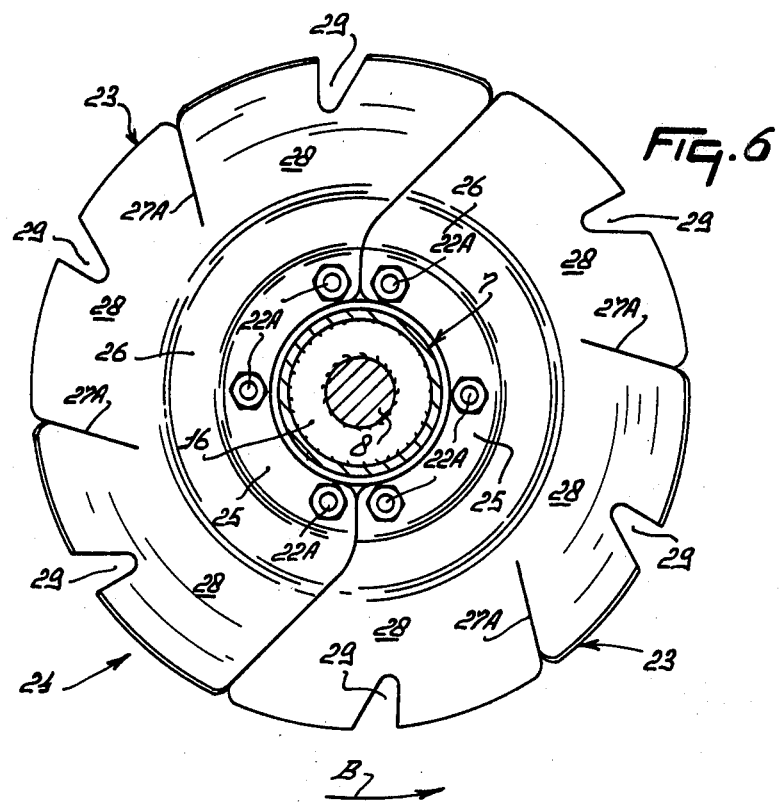
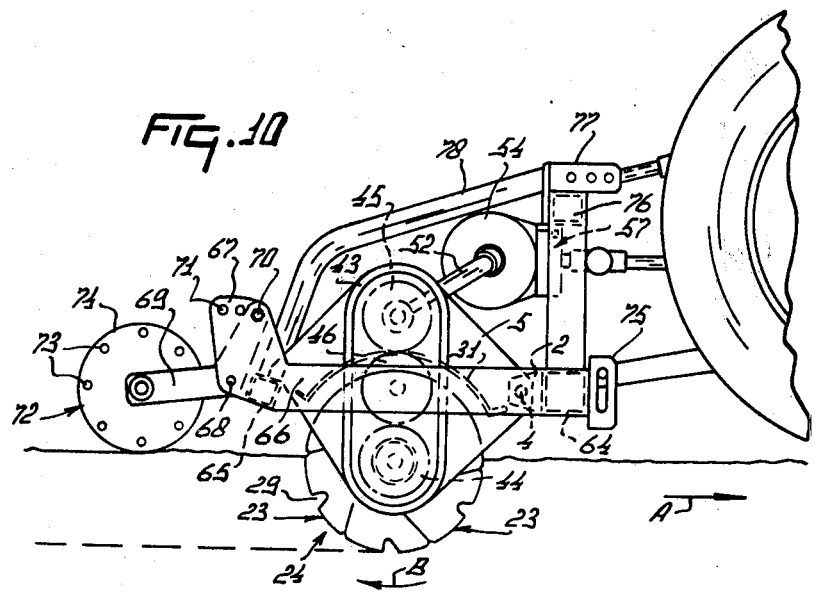

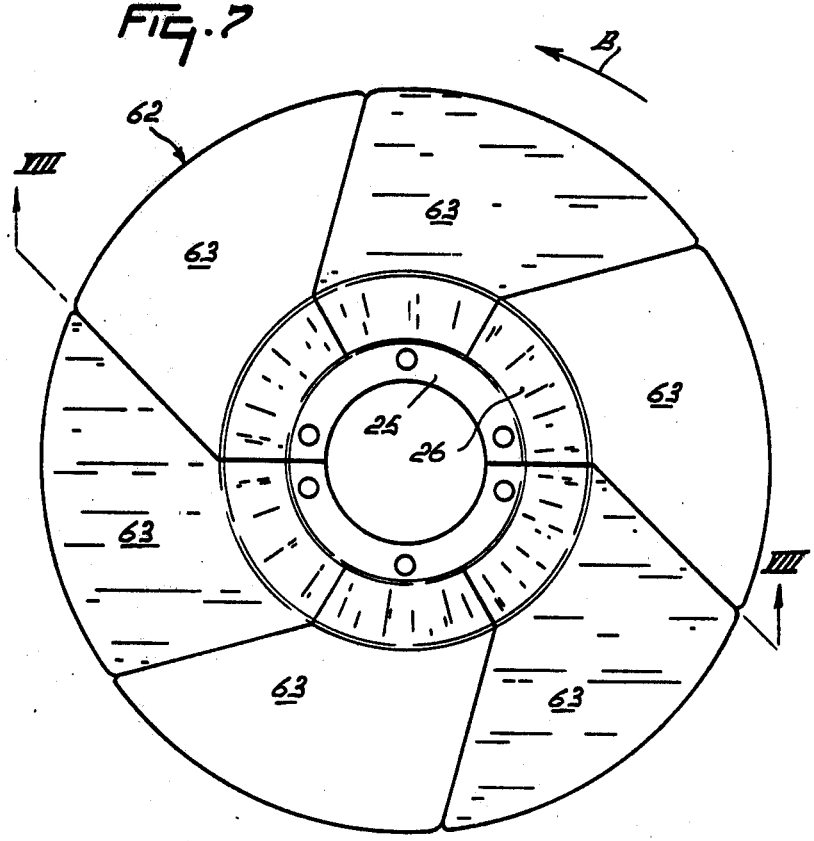
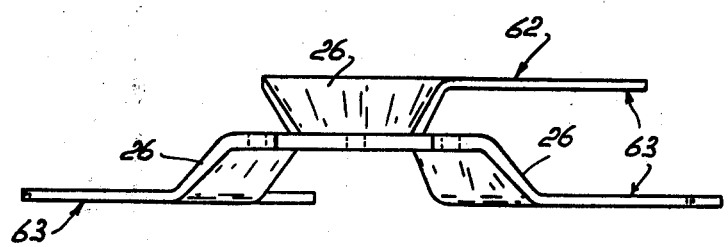

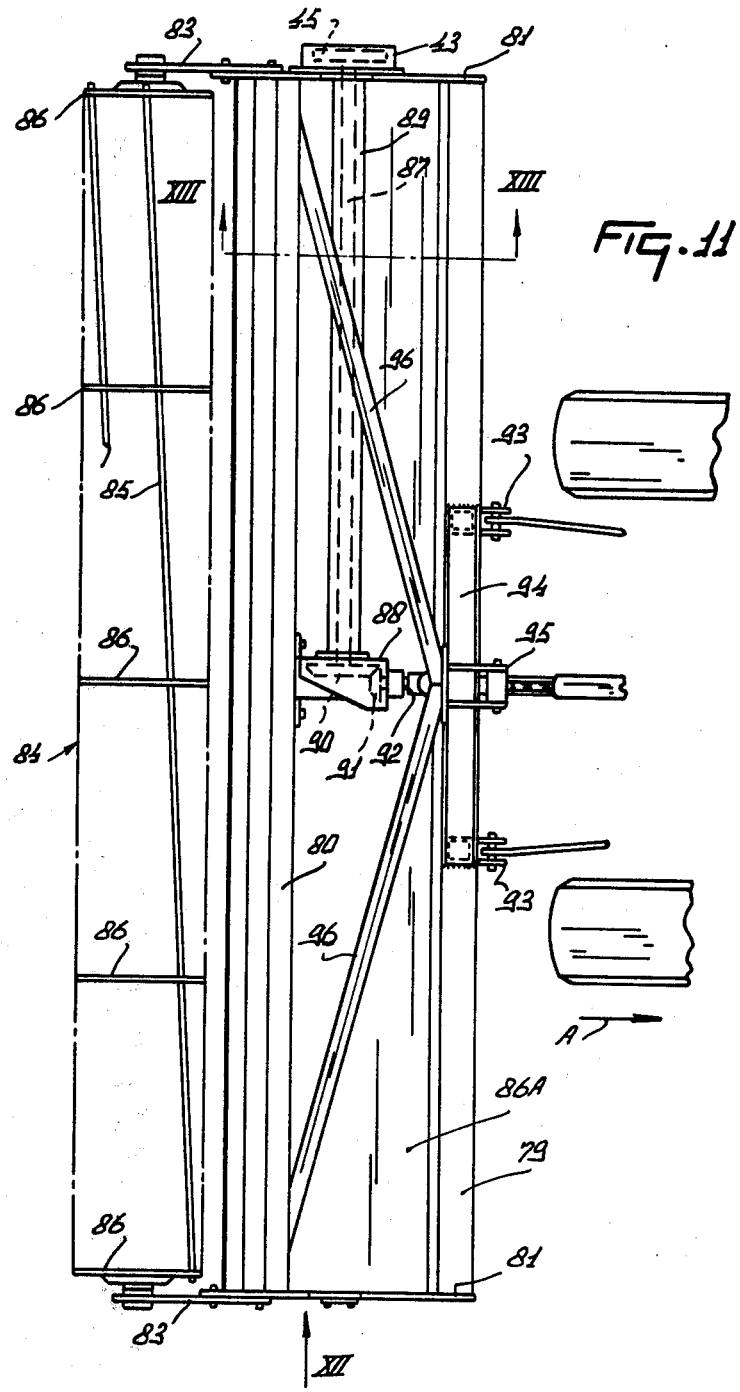

SOIL WORKING MACHINE

According to a first aspect of the present invention there is provided a soil working machine comprising a frame and a plurality of working members mounted on the frame for rotation about an axis which extends substantially transversely of the intended direction of operative travel of the machine, the working members being arranged in at least two groups disposed side by side, at least one of the groups being movable upwardly and downwardly as a unit during operation.

According to a second aspect of the present invention there is provided a soil working machine comprising a frame and a plurality of working members mounted on the frame for rotation about an axis which extends substantially transversely of the intended direction of operative travel of the machine, the working members being arranged in at least two groups each of which is pivotable about a pivot axis which extends substantially parallel to the axis of rotation of that group, the groups being disposed to work adjoining strips of soil during operation of the machine.

By using a construction in accordance with the present invention, the working width of the machine can be appreciably increased because the working members are arranged in at least two groups which may be disposed side by side and are movable upwardly and downwardly relatively to one another during operation. In this way unevennesses of the soil can be satisfactorily matched despite a large working width. In addition, damage of the working members on field having solid obstacles such as stones in the soil can be avoided.

According to a third aspect of the present invention there is provided a soil working machine comprising a frame and a plurality of working members mounted on the frame for rotation about an axis which extends substantially transversely of the intended direction of operative travel of the machine, the working members being arranged on at least one carrier which is connected at both ends with a drive chain comprising a driving shaft which is drivably connected, adjacent the middle of the machine, with a transmission gear.

For a better understanding of the present invention and to show how it may be carried into effect, reference will now be made, by way of example only, to the accompanying drawings, in which:

FIG. 2 is a view taken in the direction of the arrow II in FIG. 1;

FIG. 3 is an enlarged sectional view taken on the line III—III in FIG. 1;

FIG. 6 is an enlarged elevational view showing a component of the machine of FIG. 1;

FIG. 7 is an enlarged elevational view of an alternative construction for the component of FIG. 6;

FIG. 8 is a sectional view taken on the lines VIII—VIII in FIG. 7;

FIG. 10 is a view in the direction of the arrow X in FIG. 9;

FIG. 11 is a plan view of a third embodiment of soil working machine;

Figure 1:
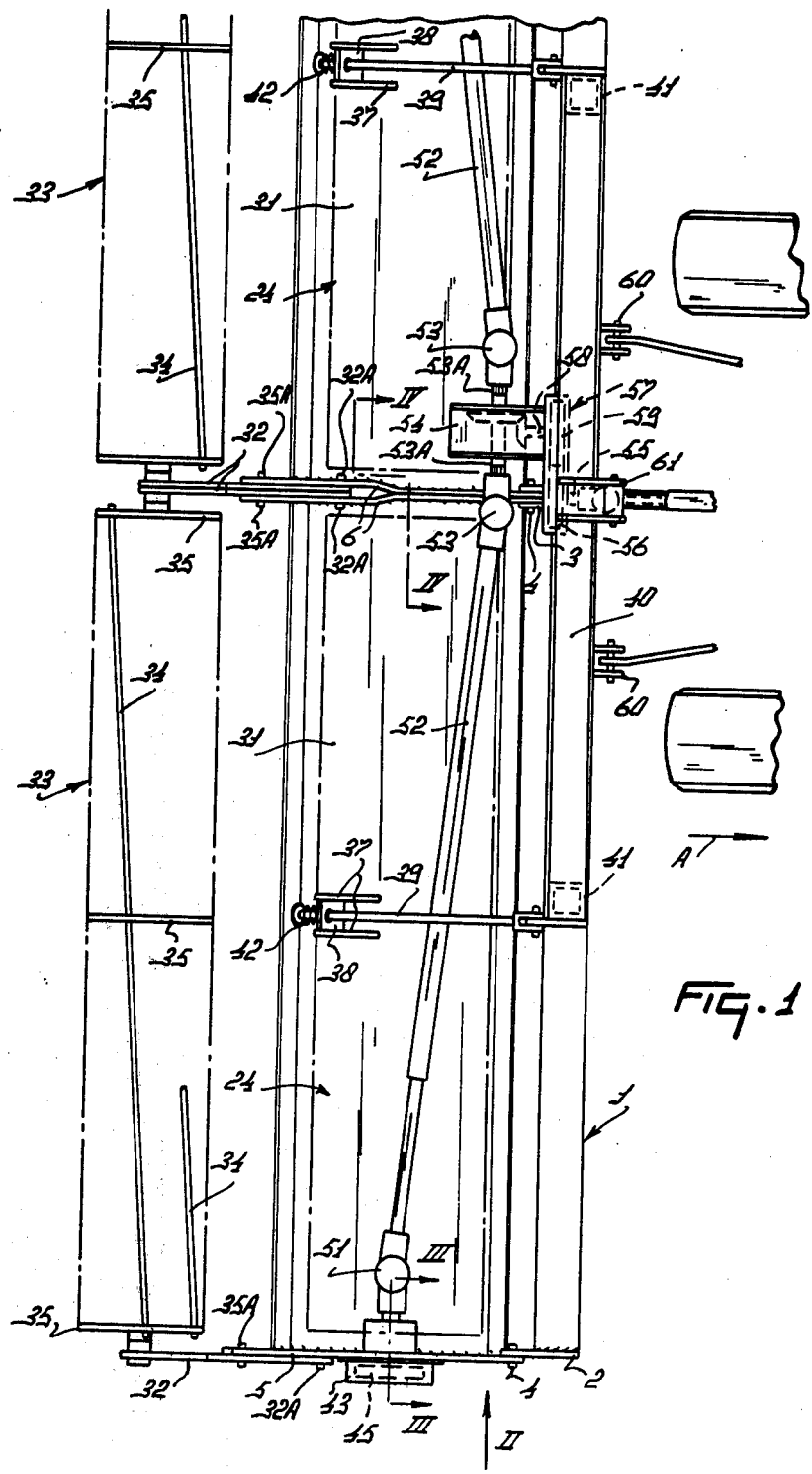
FIG. 1 is a fragmentary plan view of a soil working machine attached to the lifting device of a tractor.

The machine shown in FIG. 1 comprises a frame having a substantially horizontal frame beam 1 extending transversely of the intended direction A of operative travel of the machine. The frame beam 1 is hollow and has an angular, preferably square, cross-section. Near its ends, the frame beam 1 is provided with rearwardly extending tags 2, and near the center there are two spaced tags 3. By means of aligned pivot pins 4, whose axes extend transversely of the direction A, upwardly extending plates 5 and 6 are pivotally supported by the tags 2 and 3. The shape of the plates 5 at the ends of the frame beam 1 is shown in detail in FIG. 2 and is generally rhombic. Each plate 5 is disposed so that the front corner of its outline receives the respective pivot pin 4. The plates 6 near the center of the frame beam 1 are at a lower level than the plates 5 and are flatter on their top edge. Between each plate 6 and its adjacent plate 5 there is a carrier 7 which is mounted for rotation and extends transversely of the direction A, substantially parallel to the frame beam 1. The carrier 7 comprises a tube of preferably circular cross-section. The longitudinal centerlines of the carriers 7 are aligned. On the side away from the other carrier, each carrier 7 has a stub shaft 8, which is supported near its inner end by a support 9 arranged within the carrier and near its outer end by a flange 10, which is welded to the end of the carrier (FIG. 3). The stub shaft 8 is supported in the respective plate 5 by a ball bearing 11 located in a bearing housing 12, which is fastened to the plate 5 by bolts 13. The bearing housing 12 carries a hood 14 the outer region of which extends over the flange 10; the hood 14 and the flange 10 provide protection against soiling of the bearing during operation of the machine.

Figure 4:
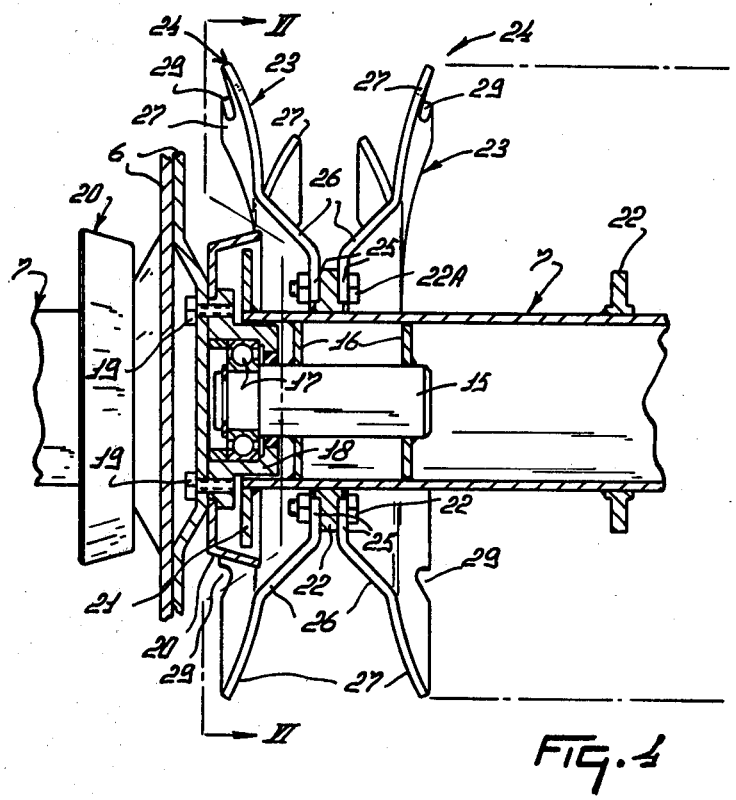
FIG. 4 is enlarged sectional view taken on the line IV—IV in FIG. 1.

The outer end of the carrier 7 has a stub shaft 15, which is supported by two spaced supporting plates 16 provided within the carrier, one of these plates being near the inner end of the stub shaft 15 and the other being offset slightly from the mid-point of the stub shaft towards the outer end (FIG. 4). The outer end of the stub shaft 15 is supported in a ball bearing 17, which is arranged in a bearing housing 18. The bearing housing 18 is fastened by bolts 19 to the adjacent plate 6. Each plate 6 has, at the place where the respective bearing housing 18 is fastened, a depression for accommodating the bolts 19. Between the bearing housing 18 and the plate 6 is clamped a hood 20, the outer region of which extends beyond a flange 21 welded to the end of the carrier 7 to provide protection for the bearing 17 of the stub shaft 15.

Each of the tubular carriers 7 has a plurality of regularly spaced rings 22 welded to the outside. The rings 22 have holes for fastening generally semicircular plates 23, constituting working elements of a disc-like working member 24. The holes in successive rings 24 are offset from those of the adjacent ones by circumferential angles of 45° about the longitudinal centerline of the carrier 7. On each side of each ring 22 are fastened by bolts 22A two identical, sector-shaped working elements 23, which meet one another along an S-shaped boundaries (FIG. 6). Each of the working elements 23 comprises a fastening portion 25 for securing it to its ring 22, this fastening portion merging into an inclined, frusto-conical portion 26. The portion 26 ends at an outer portion 27, which extends to the circumference of the element 23 and is substantially parallel to the portion 25. The portion 27 has two cuts 27A, each of which slopes to the rear from its inner end to its outer end, with respect to the intended direction B of operative rotation of the working member 24. Three identically shaped operative portions 28 are formed by the cuts 27A and are bent over alternatively to opposite sides. The portions 28 are rounded off at their leading and trailing ends. Substantially midway between the ends of each sector-shaped part 28 there is a substantially V-shaped recess 29, which is directed outwardly and slightly to the rear with respect to the direction B so that the sides of the V-shaped recess 29 are substantially parallel to the cuts 27A. Each V-shaped recess 29 is rounded off at its inner end. The consecutive sector-shaped portions 28 bent over in opposite directions constitute operative portions disposed in a sawtooth array at the circumference of the working member, the free ends of these portions forming substantially a closed circle as viewed in a direction parallel to the rotary axis of the carrier 7 (FIG. 6).

From FIG. 4 it can be seen that the portions 26 of the working elements 23 on the two sides of a ring 22 extend away from one another. Each carrier 7 with its disc-shaped working members 24 constitutes a group of working members having a working width of 1.50 to 2,25 meters, and each working member has a diameter of about 30 centimeters.

Figure 5:
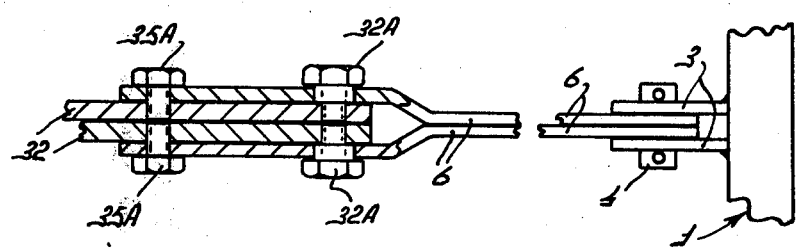
FIG. 5 is an enlarged partly sectioned view of part of the machine of FIG. 1.

Between each plate 5 and its adjacent plate 6, the respective carrier 7 with the disc-shaped working members 24 is surrounded on the top side by a screening hood 31, which is fastened to the respective plates. At its rear, each of the plates 5 and 6 has an arm 32, which is pivotable about a bolt 32A and extends to the rear along the plate. Between the rear ends of the arms 32 is arranged a freely rotatable roller 33. The roller 33 has at its circumference a plurality of elongate elements 34 extending helically along the roller, these elements being supported by support plates 35. Each of the arms 32 can be set in any one of a plurality of positions with respect to its plate 5 or 6 by means of a bolt 35A and a plurality of holes 36 in the plate, so that the roller 33 can be adjusted to set the working depth of the respective group of cultivating members. The arms 32 supporting the adjacent ends of the two rollers 33 are arranged in depressions formed in the rear regions of the plates 6 so that these two arms 32 are in contact with one another (see FIG. 5). Near its center, each screening hood 31 is provided with a pair of tags 37, between which there is a connecting piece 38 which receives a rod 39. The top end of the rod 39 is pivoted to the end of a frame beam 40 entending transversely of the direction A above the frame beam 1, to which it is fastened by supports.

Between the connecting piece 38 and a stop at the lower end of the rod 39, the rod is surrounded by a compression spring 42 so that downwards movement of the group of working members is resiliently opposed. Each of the stub shafts 8 provided on the outboard end of each tubular carrier 7 extends into a protective cover 43, which is arranged on the outboard side of the respective plate 5. Each stub shaft has, within the cover 43, a spur pinion 44. The pinion 44 is drivably in mesh with an identical pinion 46 on a stub shaft 47 which itself meshes with an identical pinion 45 on a stub shaft 45A fastened to the plate 5. The stub shaft 45A is supported by means of two spaced ball bearings 48 in a bearing housing 50 which is fastened by bolts 49 to the plate 5. The inwardly projecting end of the stub shaft 45A protruding from the protective cover 43 has splines for receiving one end of a universal joint 51 forming part of a telescopic shaft 52 (FIG. 1). The other end of the telescopic shaft 52 is provided with a universal joint 53, which is connected to a splined end of a shaft 53A, which is journalled in a gear box 54 secured to the bottom side of the beam 40 (FIG. 2). Inside the gear box 54 the shaft 53A is drivably connected by a bevel pinion transmission and a change-speed gear 57 with a shaft 55, which projects from the front of the gear box and is provided with an exchangeable pinion 56, which forms part of the change-speed gear 57 located at the front side of the gear box. The change-speed gear 57 comprises a shaft 58 extending parallel to the shaft 55 and being connected by the bevel gear wheel transmission with the shaft 53A, this shaft 58 having an exchangeable pinion 59, which meshes with the pinion 56. The shaft 55 can be connected by an auxiliary shaft to the power take-off shaft of a tractor drawing the machine. The telescopic shafts 52 form part of a drive train which is linked near its center to an orthogonal transmission.

To the front side of the frame beam 1 are attached, at equal distances from the center, pairs of tags 60 for connection to the lower arms of the lifting device of the tractor. Near the center of the beam 40 there are forwardly extending tags 61, between which the top arm of the lifting device can be fitted.

For operation, the machine is hitched by the pairs of tags 60 and 61 to the three-point lift of the tractor. The power take-off shaft of the tractor drives the groups of working members 24 via the auxiliary shaft and the transmission described above. The working members 24 turn in the direction indicated by the arrow B in FIG. 2. Before starting a job, each of the groups of working members 24 is set to the required working depth by adjusting the rollers 33. During operation the working portions 28 of the rotatable disc-shaped working members 24 pass through the soil in a direction opposite the direction of movement A of the machine. The sawtooth array of the working portions 28 provides a satisfactory crumbling effect, particularly on hard, dry soil. During operation, each group of working members 24 can deflect upwardly, independently of the other, about a pivotal axis extending transversely of the direction A in front of that group and at a higher level than the rotary axis of the group, this pivotal axis being the common longitudinal centerline of the pivot pins 4. This upward movement allows each group to pass readily over stones and other obstacles in the soil. The groups of working members 24 together work an uninterrupted strip of soil. The counterbalancing effect of the compression spring 42 surrounding the rod 39 permits each group to deflect readily. Each group of working members 24 has a working width equal to at least one third of the total width of the machine.

The identical working elements 23 forming each disc-shaped working member 24 are each fastened in a simple manner by three bolts 22A and can, if necessary, be readily replaced. Moreover, since the working portions 28 are located largely at the circumference, wear of the disc-shaped working members 24 is mainly confined to the periphery.

FIGS. 7 and 8 show an embodiment of working member in which the cuts between adjacent outwardly bent working portions 63 of the working elements 62 extend as far as fastening portion 25. In the working portions 63, the cuts slope to the rear in the radially outward direction, but in the portion 26 the cuts are substantially radial. In this embodiment the portions 63 have no recesses corresponding to the recesses 29 of the preceding embodiment.

Figure 9:
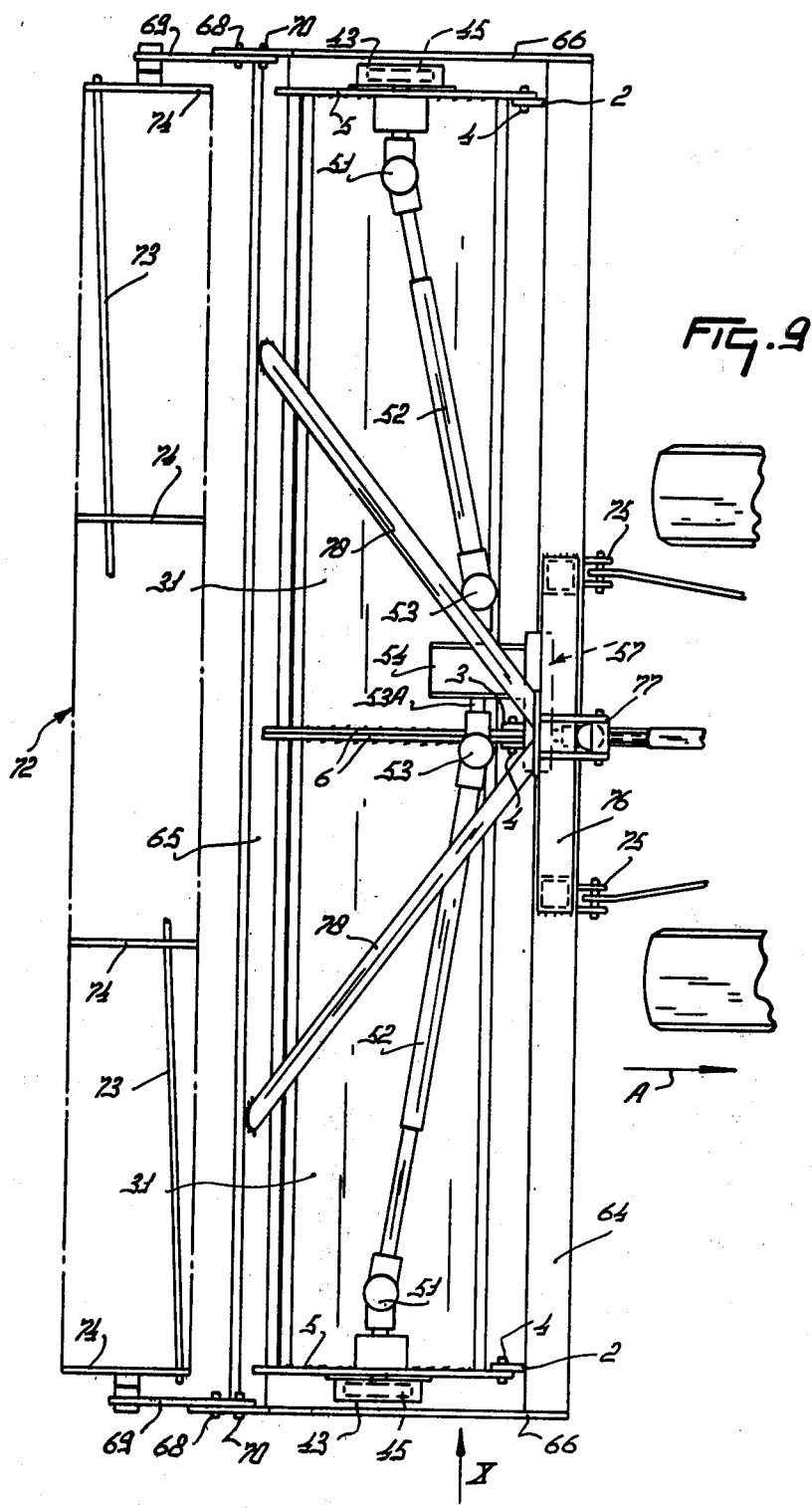
FIG. 9 is a plan view of another embodiment of soil working machine.

In the embodiment shown in FIGS. 9 and 10, the machine comprises two substantially horizontal frame beams 64 and 65 extending transversely of the direction A and disposed one behind the other. The ends of the beams 64 and 65 are interconnected by supporting plates 66 extending in the direction A. As in the preceding embodiment, upwardly and downwardly movable groups of identical working members 24 are connected side by side at the ends of the frame beams 64 and near the center by means of tags 2 and 3 and pivot pins 4. The rear of each of the supporting plates 66 terminates in an upwardly directed, flat part 67. An arm 69 having two mutually inclined portions is hinged at its middle to the part 67 by a pin 68. The arm 69 can be set in any one of a plurality of positions by means of a bolt 70, carried by one portion of the arm 69, and holes 71 in the part 67. Between the ends of the rearwardly extending other portions of the arms 69 is arranged a freely rotatable roller 72 which is provided at its circumference with a plurality of elongate elements 73 extending helically about the rotary axis of the roller and being held by the peripheries of support plates 74.

At the front, the frame beam 64 is provided at equal distances from the middle with pairs of tags 75 for connection to the lower arms of the three-point lifting device of a tractor. Between the pairs of tags 75, the frame beam 64 is provided with an upwardly extending support 76, which has at the top two relatively spaced plates 77, between which can be fitted the top arm of the lifting device. The rear ends of the plates 77 are connected with stays 78 which diverge and slope downwardly from front to rear. Towards their rear ends, the stays 78 curve downwardly to join the rear frame beam 65 (FIG. 10).

In this embodiment, the groups of working members 24, which are driven in the same manner as in the preceding embodiment, can deflect upwardly and downwardly relatively to the frame supported by the roller 72. A stop prevents excessive downward movement of the groups. As before, the roller 72 can be adjusted to set the working depth of the groups of the working members.

Figure 12:
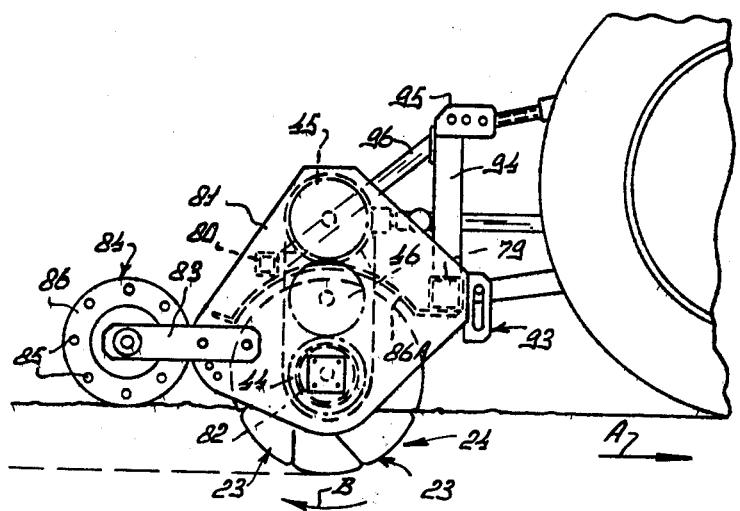
FIG. 12 is a view in the direction of the arrow XII in FIG. 11.
Figure 13:
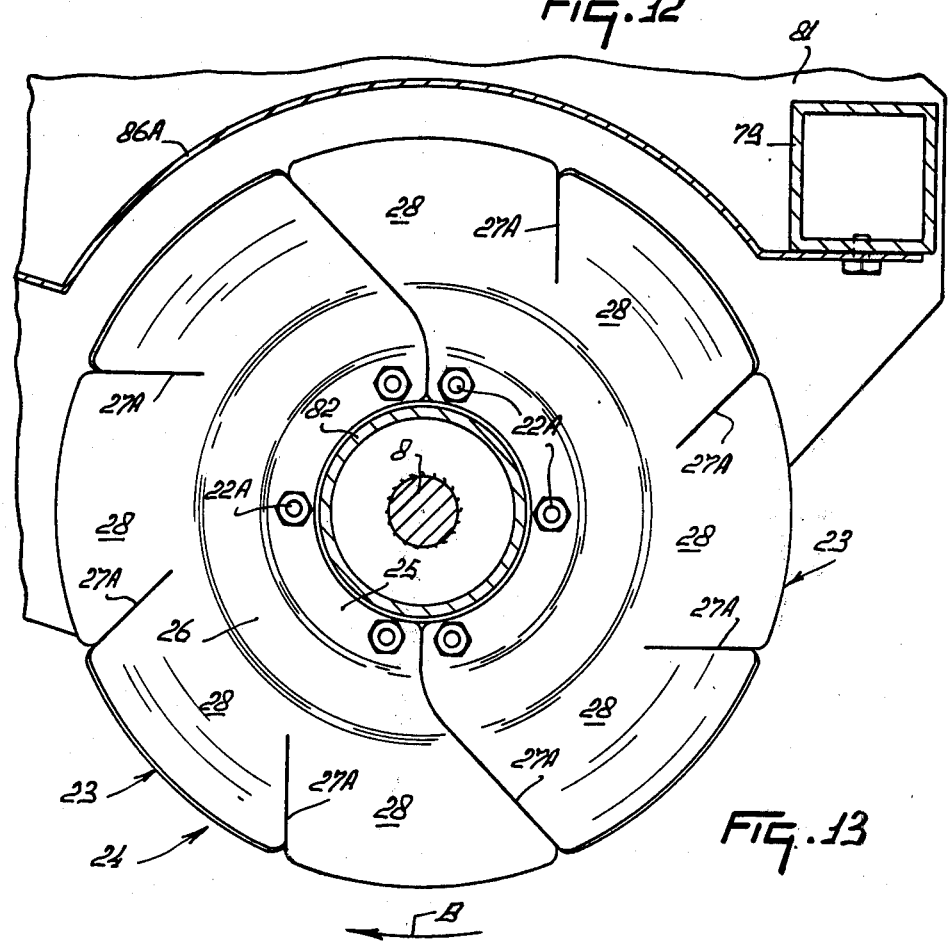
FIG. 13 is an enlarged sectional view taken on the line XIII—XIII in FIG. 11.

FIGS. 11 to 13 show a third embodiment of a soil working machine, in which the frame comprises two frame beams 79 and 80 extending transversely of the direction A and lying one behind the other, their ends being interconnected by upwardly extending plates 81. The plates 81, as can be seen from FIG. 12, have the shape of a lozenge, the front frame beam 79 being fastened at one corner. Between the plates 81, there is a tubular carrier 82 of a group of cultivating members. The carrier 82 is supported at its ends in the same manner as the ends of each of the carriers 7 in the preceding embodiments.

The cultivating members are constructed in substantially the same manner as those of FIGS. 1 to 6, and the same reference numerals are used.

At the rear of the plates 81, rearwardly extending arms 83 are mounted so as to be pivotable. They can be set in any one of a plurality of positions. A freely rotatable roller 84 is arranged between the rear ends of the arms 83. The roller 84 has a plurality of elongate elements 85 at the circumference extending helically along the roller; these elements 85 are supported at the circumference of support plates 86. A group of working members is covered on the upper side by a screening hood 86A which is arranged between the plates 81. The drive of the group of working members is applied at one end through a gear wheel transmission which is identical to that of the preceding embodiments. The upper pinion 45 of the transmission is on the end of a shaft 87, the other end of which is journalled in a gear box 88. The shaft 87 is housed in a tube 89 arranged between the respective plate 81 and the gear box 88. Inside the gear box 88, the shaft 87 is provided with a bevel pinion 90 adapted to co-operate with a bevel pinion 91 on a shaft 92, which projects from the front of the gear box 88 and can be coupled by an auxiliary shaft with the power take-off shaft of a tractor.

At the front, the frame beam 79 is provided at equal distances from the center with pairs of tags 93 for connection to the lower arms of the lifting device of a tractor. Between the tags on the frame beam 79 there is a support 94 which extends upwards and carries at the top two spaced plates 95, between which the top arm of the lifting device of the tractor can be fitted. The rear ends of the plates 95 are connected to the ends of the rear frame beam 80 by stays 96 which slope downwardly, and diverge, from front to rear.

In this embodiment the working portions 28 of the working elements 23 have no V-shaped recess.

During operation, the group of working members cannot deflect upwardly or downwardly with respect to the frame. By adjusting the roller 84, the working depth of the group of working members can be set.

While various features of the machines that have been described, and that are illustrated in the drawings, will be set forth in the following claims as inventive features, it is to be noted that the invention is not necessarily limited to these features and that it encompasses all of the features that have been described both individually and in various combinations.

I claim:

1. A soil cultivating machine comprising a frame and rotatable cultivating means journalled on said frame, said cultivating means comprising a plurality of cultivating members mounted on substantially horizontal shaft means that extends transverse to the direction of machine travel, said cultivating members each comprising semicircular working elements that form a substantially closed circle when viewed from the side and said elements being separated from one another, at least in part.

2. A soil cultivating machine as claimed in claim 1, wherein said working elements are identical in structure.

3. A soil cultivating machine as claimed in claim 1, wherein said working elements adjoin one another along S-shaped boundaries.

4. A soil cultivating machine as claimed in claim 3, wherein said elements each have a fastening portion adjoining an inclined, straight portion and the latter terminates in a further portion that extends to the circumference of said working element, said further portion being generally parallel to said fastening portion.

5. A soil cultivating machine as claimed in claim 4, wherein said further portion has incisions that define at least three substantially identical operative portions.

6. A soil cultivating machine as claimed in claim 5, wherein successive operative portions are relatively bent over in opposite directions, whereby the operative portions of two working elements form a disc-shaped cultivating member with a sawtooth circumference.

7. A soil cultivating machine as claimed in claim 5, wherein said incisions are slightly inclined to the rear for at least part of their length relative to the normal direction of member rotation.

8. A soil cultivating machine as claimed in claim 5, wherein the transitional area between an incision and the periphery of an operative portion is rounded off.

9. A soil cultivating machine as claimed in claim 8, wherein an operative portion of at least one working element has, between the rounded-off parts, a substantially V-shaped recess and said recess is slightly inclined to the rear with respect to the normal direction of rotation.

10. A soil cultivating machine as claimed in claim 5, wherein a disc-shaped cultivating member is arranged on either side of a ring and the respective working elements are in relatively specular positions, respective bent-over portions of the working elements diverging from one another.

* * * * *